Figure 1:
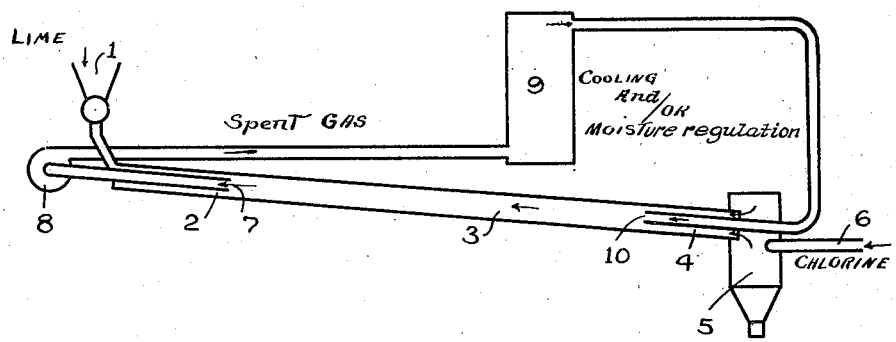

Jan. 2, 1923. 1,440,620
O. NYDEGGER.
METHOD OF COMBINING A SOLID WITH A GAS.
FILED SEPT. 18, 1920.

Inventor
Otto Nydegger
By his Attorneys
Emery Varney Blair and Hoguet

Patented Jan. 2, 1923.

1,440,620

UNITED STATES PATENT OFFICE.

OTTO NYDEGGER, OF BERN, SWITZERLAND.

METHOD OF COMBINING A SOLID WITH A GAS.

Application filed September 18, 1920. Serial No. 411,275.

*To all whom it may concern:*

Be it known that I, OTTO NYDEGGER, a citizen of Switzerland, and a resident of Bern, Switzerland, have invented an Improvement in Method of Combining a Solid with a Gas, of which the following is a specification.

The present invention relates to a method of combining a solid with a gas, one object being to provide a continuously operative process in the practice of which there will be substantially uniform quality of product and automatic control and regulation of temperature.
The absorption of gases by solid materials technically produced in large quantities, and especially the absorption of chlorine by lime for the production of chloride of lime, has heretofore been effected in chamber-like compartments which are periodically filled and emptied. These chambers have only a small degree of efficiency in proportion to their size, and to the amount of manual labor required in their operation. Continuously operating apparatus is preferable and has been used in the manufacture of chloride of lime, but its efficiency has remained comparatively limited since there appears, especially in the absorption of high percentage or concentrated chlorine gases, from light to heavy local reactions, and, consequently, a considerable heating, so that a good product is not always obtained. This would be even more pronounced in apparatus of greater capacity if no provisions were made for the appropriate escape of the reaction heat.

In the present process, it is possible to dispose of the reaction heat in a relatively simple manner without interrupting the operation or capacity of the apparatus. According to this process the gas not only circulates continuously from one end to the other of the absorption apparatus, preferably in a contrary direction to that of the absorption medium, but, in addition, a circuit is inserted into this apparatus for the spent gas, by means of which it is again made available in a suitable manner for absorption purposes. This circuit consists, on the one hand, either of the entire absorption apparatus, or, for practical purposes, only of its main absorption or reaction zone, and, on the other hand, of a suitable cooling or condensing apparatus, by means of which the gas is again brought to the temperature suitable for absorption, and, if desired, to a suitable degree of moisture. This circuit also performs the function, in addition to temperature and moisture regulation, of effecting the dilution or a rarefication of the gas, appropriate for the requirements of the main absorption zone and this dilution, in consequence of the strong circulation, remains more or less uniform, being regulated automatically so that during exceptionally good absorption more gas capable of absorption is taken up from the gas mixture by the absorption medium than is supplied by the gas feeder, and the mixture is thus somewhat impoverished until an equalization again sets in. On the other hand, the mixture may become more concentrated during poor absorption in which event, less of the concentrated gas will be entrained into the current of the gas mixture.

Figure 2:
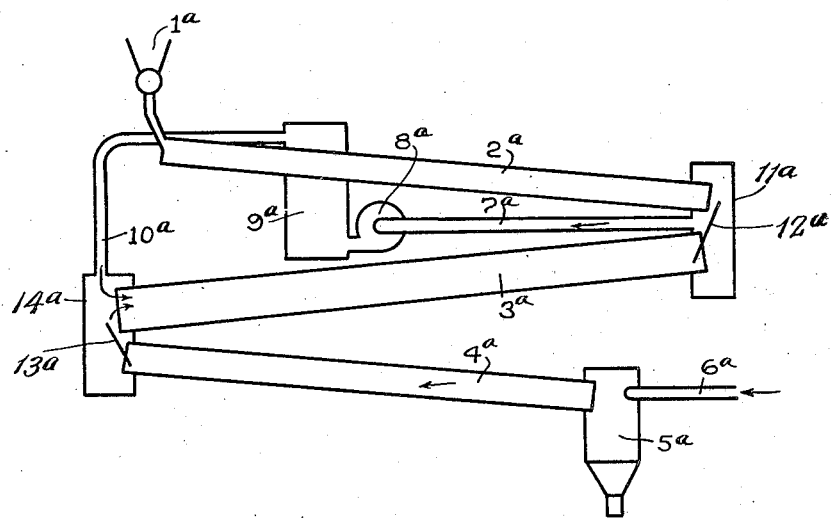

Apparatus by means of which my improved method may be practiced is illustrated in the drawings accompanying the present specification and in which Figure 1 is a diagrammatic view of one form of apparatus, and Figure 2, a diagrammatic view of another form of apparatus having a plurality of conduits.

Referring to Figure 1 of the drawings, a supply of material, as lime, to be exposed to a gaseous reagent, as chlorine, may be introduced continuously from a hopper 1 into the receiving end 2 of an inclined conduit 3, said conduit being rotatable. The gas to which the material is to be exposed may be introduced from any suitable source of supply through an inlet 6 preferably adjacent to the discharge end of the conduit 3. By rotating the conduit 3 while the solid material in comminuted or granular form is being introduced at the upper end and gas is being introduced at the lower end, the material will be continuously moved from the upper end to the lower end of the conduit by the force of gravity and, in so moving, the particles will be successively exposed to gas or a gas mixture of constantly increasing richness. The product is then discharged into the member 5 which may be the shipping receptacle or the storage receptacle, as desired.

In order to provide suitable dilution of the gas and to control the temperature in the conduit 3 where the reaction takes place and thereby to insure uniformity of operation and product, I provide a regulating circuit including a vent 7 to carry off the spent gases which are forced through a condenser or cooler 9 by means of a pump 8. The cooler 9 may be supplied with cooling means and with means for increasing or decreasing the moisture in the gas and the gas thus treated is reintroduced into the conduit 3 by means of an inlet member 10 to cool the conduit and to dilute the newly introduced concentrated gas. While the drawings show means for introducing the cooling or moistened gas at the discharge end of the conduit 3, it is contemplated that said gas as well as the concentrated gas, may be introduced at any other suitable place to effect the diluting and cooling intended.

The apparatus illustrated in Figure 2 is similar in operation to that illustrated in Figure 1 except that the material is subjected to a more extended treatment taking place in a plurality of revolving conduits instead of in one single revolving conduit.

Accordingly, in Figure 2, the apparatus is shown to include a hopper $1^a$ communicating with a rotatable drum $2^a$ having its discharge end supported in a receptacle $11^a$ and in position to deposit material upon a chute or other material guiding member $12^a$ which in turn deflects the material into the receiving end of another rotating drum $3^a$, discharging upon a chute $13^a$ arranged in a receptacle $14^a$. The latter also supports the discharge end of the drum $3^a$ and the receiving end of another drum $4^a$ into which the material flows from the chute $13^a$. The discharge end of drum $4^a$ is positioned within a receptacle $5^a$ which also admits a gas feeder $6^a$. After traversing the drums $4^a$ and $3^a$ successively the spent gas or mixture is withdrawn through a conduit $7^a$ by means of a fan or other suitable exhaust mechanism $8^a$ and is subjected to cooling, moistening or other appropriate treatment in the container $9^a$ from which it is withdrawn and again returned by a conduit $10^a$ to commingle with gas in the receptacle $14^a$ and about to enter the drum $3^a$, the direction of flow of the gas in the system being indicated in the drawing by arrows.

In practicing my process of combining solids with gas, I subject said solids in comminuted form and while being advanced through a gas confining conduit to a gas mixture of suitable concentration or dilution and preferably, though not necessarily moving in a direction opposite to that of the solid. To reduce the heat of reaction, I withdraw the spent and heated gases, cool the same, and then return them in continuous circulation to the zone of reaction and in effective cooling contact with the advancing solid and mix them with the newly introduced concentrated gas. Under some conditions of use, it may be desirable to increase or decrease the moisture in the spent gases while cooling the same.

From the foregoing description, it will appear that my improved apparatus or my improved process will permit the economical and effective manufacture of products resulting from the reaction between a gas and a solid, such for example as chloride of lime or bleaching powder. Where the operation of the apparatus is continuous, the product is of uniform quality, and there is practically no waste of material either gaseous or solid. Furthermore, the heat of reaction is reduced and the heated gas is cooled and returned to the reaction zone in an automatic and effective manner. Moreover, the richness of the gas in the reaction zone is automatically regulated so that the degree of concentration of the gas at various points in the reaction zone will be substantially inversely proportionate to the absorbing capacity of the solid as it advances through said zone, thus extending the period of reaction and as a result reducing the rate of heating during said reaction.

The regulation or equalization hereinabove referred to is apparently based upon the action of the circulatory system which produces a uniform current through the reaction zone. With a supply of concentrated mixture available for entrainment by this circulating current, it will be clear that, when the solid absorbs gas more rapidly, the pressure in the reaction zone will diminish and more of the concentrated mixture will be entrained. However, when the rate of absorption of gas by the solid is slower, the pressure will not diminish as much and less of the concentrated mixture will be entrained. In this manner the richness of the mixture in the reaction zone is controlled so that there will be a substantially uniform rate of absorption throughout the reaction zone.

I claim as my invention:

1. The method of combining a solid with a gas in which the reaction produces heat and which includes subjecting the solid in comminuted form to gas absorbing contact successively with a spent gas mixture, a dilute gas mixture, and a concentrated gas mixture in an absorption chamber, continuously withdrawing and cooling the spent gas mixture and returning the cooled mixture to the absorption chamber to mix with the concentrated gas to form the dilute mixture.

2. The method of chlorinating lime which includes exposing the lime in comminuted form in gas absorbing contact with a continuously circulating mixture of chlorine, cooling the spent mixture while out of reaction producing contact with the lime and exposing the lime to the cooled spent mixture.

3. The method of chlorinating lime which includes exposing the lime in comminuted form in gas absorbing contact with a continuously circulating mixture of chlorine, cooling the spent mixture while out of reaction producing contact with the lime, mixing the spent cooled mixture with a fresh supply of chlorine and exposing the lime to the resulting mixture.

4. The method of combining a solid with a gas in which the reaction produces heat which includes exposing the solid in comminuted form in gas absorbing contact with a continuously circulating gas mixture, cooling the spent mixture while out of reaction producing contact with the solid, and mixing the spent cooled mixture with a fresh supply of gas while both are in reaction producing contact with the solid.

5. The method of combining a solid with a gas in which the reaction produces heat which includes subjecting the solid in comminuted form to gas absorbing and heat generating contact with a continuously replenished circulating gas stream, cooling a heated portion of the gas while out of reaction producing contact with the solid, and continuously introducing the cooled gas initially into effective cooling contact with incompletely treated portions of the solid.

6. The method of chlorinating lime which includes exposing the lime in comminuted form in chlorine absorbing contact with a chlorine mixture, withdrawing and cooling the spent mixture, returning the cooled spent mixture into effective modifying contact with partly treated lime and then exposing said lime to concentrated chlorine, all in a continuous operation.

7. The method of combining a solid with a gas in a heat producing reaction which includes exposing the solid in comminuted form to a gas, withdrawing and cooling the gas heated by the reaction, exposing partly treated portions of the solid to the cooled gas to reduce the reaction heat, and then exposing said cooled portions of the solid to increasingly concentrated gas.

In testimony whereof, I have signed my name to this specification this third day of September, 1920.

Dr. OTTO NYDEGGER.